(12) United States Patent
Lin et al.

(10) Patent No.: US 11,866,070 B2
(45) Date of Patent: Jan. 9, 2024

(54) VEHICLE CONTROL METHOD AND APPARATUS, STORAGE MEDIUM, AND ELECTRONIC DEVICE

(71) Applicant: Guangzhou Automobile Group Co., Ltd., Guangdong (CN)

(72) Inventors: Xiao Lin, Sunnyvale, CA (US); Jiucai Zhang, Arvada, CO (US); Jin Shang, Sunnyvale, CA (US); Yi Wang, Guagndong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 362 days.

(21) Appl. No.: 17/033,982

(22) Filed: Sep. 28, 2020

(65) Prior Publication Data

US 2022/0097736 A1  Mar. 31, 2022

(51) Int. Cl.
| | |
|---|---|
| *B60W 60/00* | (2020.01) |
| *B60W 30/18* | (2012.01) |
| *B60W 40/04* | (2006.01) |
| *B60W 30/095* | (2012.01) |
| *G06N 5/01* | (2023.01) |
| *G06N 7/01* | (2023.01) |

(52) U.S. Cl.
CPC .. *B60W 60/00274* (2020.02); *B60W 30/0956* (2013.01); *B60W 30/18159* (2020.02); *B60W 40/04* (2013.01); *B60W 60/0011* (2020.02); *B60W 60/0015* (2020.02); *G06N 5/01* (2023.01); *G06N 7/01* (2023.01); *B60W 2556/50* (2020.02)

(58) Field of Classification Search
None
See application file for complete search history.

(56) References Cited

U.S. PATENT DOCUMENTS

| | | | | |
|---|---|---|---|---|
| 11,794,776 B2* | 10/2023 | Larsson | ............. | B60W 60/001 |
| 2014/0358322 A1* | 12/2014 | Ibrahim | ............... | G05D 1/0055 |
| | | | | 701/1 |
| 2020/0249038 A1* | 8/2020 | Nashed | ................ | G06F 18/295 |
| 2021/0101625 A1* | 4/2021 | Shrestha | .......... | B60W 60/00272 |
| 2021/0197858 A1* | 7/2021 | Zhang | ............... | B60W 60/0011 |
| 2021/0253128 A1* | 8/2021 | Nister | ...................... | G06N 3/08 |
| 2022/0126864 A1* | 4/2022 | Moustafa | ............... | B60W 50/14 |
| 2022/0250644 A1* | 8/2022 | Larsson | .......... | B60W 60/00272 |

FOREIGN PATENT DOCUMENTS

CN   109933086 A   6/2019

OTHER PUBLICATIONS

U.S. Appl. No. 62/826,955, which US 2022/0126864 A1 claims domestic benefit to, filed Mar. 29, 2019, Moustafa et al. (Year: 2019).*

* cited by examiner

*Primary Examiner* — Thomas E Worden
(74) *Attorney, Agent, or Firm* — ScienBiziP, P.C.

(57) ABSTRACT

Disclosed are a vehicle control method, a vehicle control apparatus, and a storage medium. The method includes acquiring real-time road condition information about an ego vehicle. The real-time road condition information can be used to indicate whether the ego vehicle arrives at an intersection. Vehicle state information can be acquired when the ego vehicle arrives at the intersection. Once a prediction result is obtained based on the vehicle state information, the ego vehicle can be controlled according to the prediction result.

16 Claims, 6 Drawing Sheets

VEHICLE CONTROL METHOD AND APPARATUS, STORAGE MEDIUM, AND ELECTRONIC DEVICE

TECHNICAL FIELD

The present invention relates to the field of vehicle control, and in particular, to a vehicle control method and apparatus, a storage medium, and an electronic device.

BACKGROUND

Nowadays, in order to simplify driving operations, there are more and more smart driving technologies applied to vehicles to assist a driver to complete a driving process more safely and reliably. Obviously, automatic driving has been identified as an important development trend.

However, for an intersection without a signal light, currently existing automatic driving technology still cannot deal with various undetermined traffic situations in this scenario. For example, a moving vehicle often appears suddenly at an intersection, so that a current driving view of a target vehicle in autonomous driving is blocked, thereby causing the target vehicle to easily collide with a potential obstacle in a blocking area. That is to say, when the vehicle in the related art passes through the intersection, since the road condition cannot be completely understood, it is difficult to effectively guarantee the driving safety during the vehicle control.

In view of the above problems, no effective solution has been proposed.

SUMMARY

Embodiments of the present invention provide a vehicle control method and apparatus, a storage medium, and an electronic device, so as to at least solve a technical problem in the related art that a vehicle control method has relatively low control security.

According to one aspect of the embodiments of the present invention, a vehicle control method is provided, comprising: acquiring real-time road condition information of an ego vehicle; when the real-time road condition information indicates that the ego vehicle has arrived at a target intersection, acquiring vehicle state information, the vehicle state information comprising first vehicle state information on the ego vehicle in a current running state and second vehicle state information on an object vehicle in a current running state in a predetermined region encompassing the target intersection and a predetermined area of inbound and outbound lanes of the target intersection adjacent the target intersection, wherein the object vehicle includes an environment vehicle passing through the target intersection and a virtual vehicle configured for a current observation field of view of the ego vehicle; inputting the first vehicle state information and the second vehicle state information into a vehicle motion prediction model to obtain a prediction result, wherein the vehicle motion prediction model is used for predicting a driving motion of the ego vehicle in a next control cycle based on the vehicle state information in a current control cycle; controlling the ego vehicle to perform a target running operation based on the prediction result.

According to another aspect of the embodiments of the present invention, a vehicle control apparatus is further provided, comprising: a first acquiring unit, configured to acquire real-time road condition information of an ego vehicle; a second acquisition unit, when the real-time road condition information indicates that the ego vehicle has arrived at a target intersection, acquiring vehicle state information, the vehicle state information comprising first vehicle state information on the ego vehicle in a current running state and second vehicle state information on an object vehicle in a current running state in a predetermined region encompassing the target intersection and a predetermined area of inbound and outbound lanes of the target intersection adjacent the target intersection, wherein the object vehicle includes an environment vehicle passing through the target intersection and a virtual vehicle configured for a current observation field of view of the ego vehicle; an input prediction unit for inputting the first vehicle state information and the second vehicle state information into a vehicle motion prediction model to obtain a prediction result, wherein the vehicle motion prediction model is used for predicting a driving motion of the ego vehicle in a next control cycle based on the vehicle state information in a current control cycle; and a control unit configured to control the ego vehicle to perform a target running operation based on the prediction result.

According to another aspect of the embodiments of the present invention, a computer readable storage medium is further provided. The computer readable storage medium stores a computer program, wherein the computer program is configured to execute the vehicle control method during running.

In the embodiments of the present invention, When the ego vehicle is about to pass through the target intersection, a corresponding virtual vehicle is configured for an observation field of view at which the target intersection is blocked, to simulate potential movement obstructions within occlusion areas, combining vehicle state information about an environment vehicle which actually pass through the predetermined region and the ego vehicle, the target travel motion at the time when the ego vehicle passes through the target intersection is predicted by the vehicle motion prediction model. The method enables the ego vehicle to comprehensively know road condition information about a target intersection when passing through the target intersection autonomously, so as to avoid collision risks during driving, thereby achieving the effect of improving the safety of vehicle control, and then overcoming the technical problem of relatively low safety of vehicle control in the related art.

BRIEF DESCRIPTION OF THE DRAWINGS

Drawings, provided for further understanding of the present invention and forming a part of the description, are used to explain the present invention together with embodiments of the present invention rather than to limit the present invention. In the drawings.

DETAILED DESCRIPTION OF THE EMULSIONS

To make persons skilled in the art better understand the solutions of the present invention, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall belong to the scope of protection of the present invention.

It should be noted that, terms such as "first" and "second" in the description, claims, and the accompanying drawings of the present invention are used to distinguish similar objects, but are not necessarily used to describe a specific sequence or order. It should be understood that the data so used may be interchanged where appropriate so that the embodiments of the invention described herein can be implemented in sequences other than those illustrated or described herein. In addition, the terms "include" and "have", and any variations thereof, are intended to cover a non-exclusive inclusion, for example, a process, method, system, product, or apparatus that includes a series of steps or units is not necessarily limited to those steps or units that are expressly listed, but may include other steps or units that are not expressly listed or inherent to such process, method, product, or apparatus.

Figure 1:
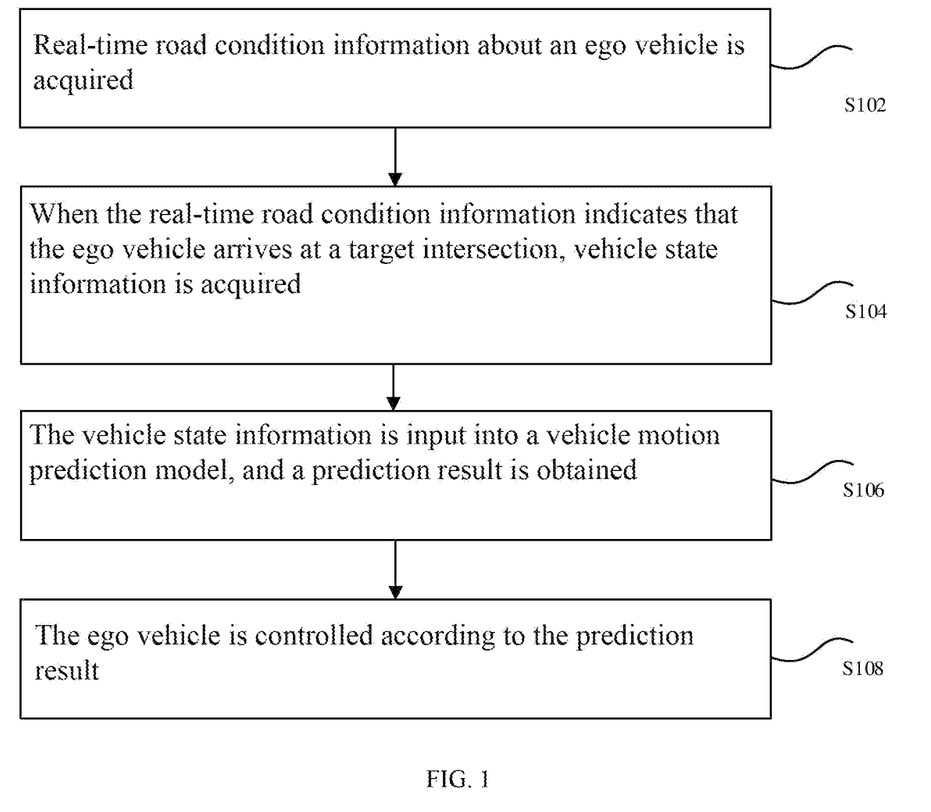
FIG. 1 is a flowchart of an alternative vehicle control method according to an embodiment of the present invention.

According to one aspect of the embodiments of the present invention, a vehicle control method is provided. Optionally, as an optional implementation, as shown in FIG. 1, the vehicle control method includes:

S102, acquiring real-time road condition information about an ego vehicle;

S104, When the real-time road condition information indicates that the ego vehicle arrives at the target intersection, acquiring vehicle state information, the vehicle state information comprising first vehicle state information about the ego vehicle in a current travelling state and second vehicle state information about an object vehicle in a predetermined region encompassing the target intersection and a predetermined area of inbound and outbound lanes of the target intersection adjacent the target intersection in the current travelling state, wherein, the object vehicle includes: an environment vehicle passing through the target intersection and a virtual vehicle configured for a current observation field of view of the ego vehicle;

S106, inputting first vehicle state information and second vehicle state information into a vehicle motion prediction model to obtain a prediction result, wherein the vehicle motion prediction model is used for predicting a driving motion of a vehicle in a next control cycle based on the vehicle state information about the vehicle in a current control cycle;

S108, controlling the ego vehicle to execute a target running action according to the prediction result.

Optionally, in this embodiment, the foregoing vehicle control method may be applied to, but not limited to, a vehicle configured with Advanced Driver Assistance System (ADAS), so as to assist the vehicle to complete an efficient and safe driving control operation during automatic driving. The ADAS system uses various sensors installed on a vehicle to sense the surrounding environment at any time during the running of the vehicle, collects data, performs recognition, detection and tracking of static and dynamic objects, collects map data of a navigator, and performs calculation and analysis of the system, so that a driver is aware in advance of a possible danger, thereby effectively increasing the driving safety of the vehicle.

Incidentally, in the present embodiment, after the real-time road condition information of the ego vehicle is acquired, if the real-time road condition information indicates that the ego vehicle arrives at the target intersection, the first vehicle state information of the ego vehicle in the current traveling state and the second vehicle state information of the object vehicle in the predetermined region in the current traveling state are acquired. The object vehicle here includes an environment vehicle that is passing through the target intersection and a virtual vehicle that is configured for the current observation field of view of the ego vehicle. Inputting the first vehicle state information and the second vehicle state information into a vehicle motion prediction model for predicting a traveling behavior of the ego vehicle based on the vehicle state information, so as to obtain a prediction result, and controlling the ego vehicle to execute a target traveling behavior according to the prediction result. That is, when the ego vehicle is about to pass through the target intersection, a corresponding virtual vehicle is configured for an observation field of view at which the target intersection is blocked, to simulate potential movement obstructions within occlusion areas, combining vehicle state information about the ego vehicle and an environment vehicle which actually pass through the predetermined region, the target running action at the time when the ego vehicle passes through the target intersection is predicted by the vehicle motion prediction model. The method enables the ego vehicle to comprehensively know road condition information about a target intersection when passing through the target intersection autonomously, so as to avoid collision risks during driving, thereby achieving the effect of improving the safety of vehicle control, and then overcoming the technical problem of relatively low safety of vehicle control in the related art.

Figure 2:
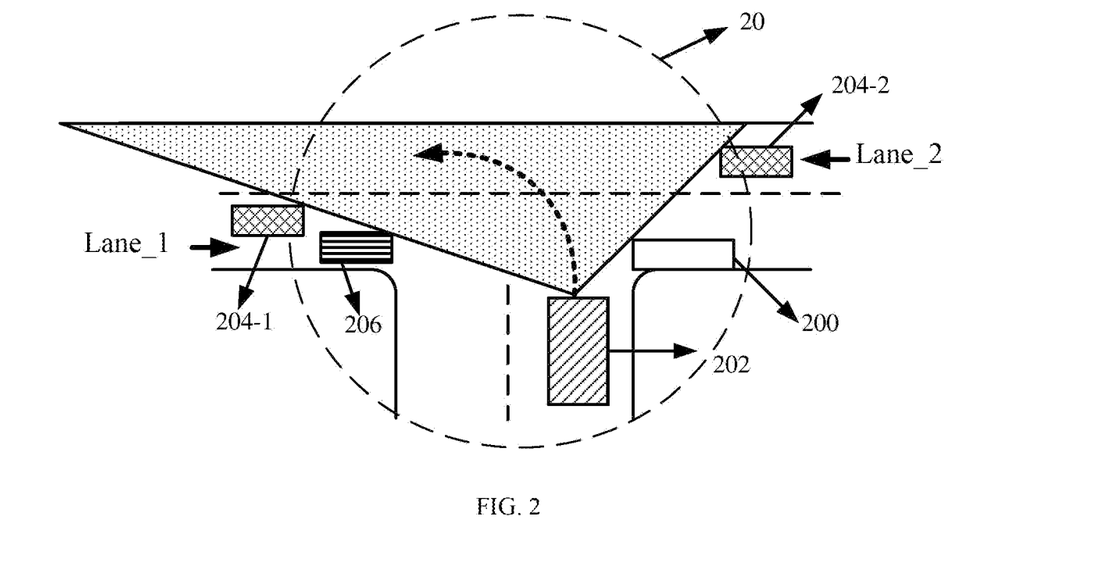
FIG. 2 is a schematic diagram of an application environment of an optional vehicle control method according to an embodiment of the present invention.

The description is specifically made in conjunction with what is shown in FIG. 2: it is assumed that what is shown in FIG. 2 is real-time road condition information about a target intersection 20 currently reached by an ego vehicle 202; furthermore, it is assumed that the current travelling intention of the ego vehicle 202 is to turn left, and as shown in the direction indicated by the dashed line with an arrow in FIG. 2, the ego vehicle 202 will turn left to enter a transverse lane. The transverse lane comprises two lanes Lane_1 and Lane_2, in which the direction of passing of the lane Lane_1 is opposite to the travel direction of the ego vehicle 202, and the direction of passing of the lane Lane_2 is the same as the travel direction of the ego vehicle 202. Further, here, the diagonally-filled rectangle 202 is used to represent the ego vehicle 202, the grid-filled rectangle 204-1 and the grid-filled rectangle 204-2 are used to represent the virtual vehicle 204-1 and the virtual vehicle 204-2 provided at the boundaries of the two sides of the current observation field of view, the traverse-line-filled rectangle is used to represent the environmental vehicle 206, and the blank rectangle 200 is used to represent the static obstacle 200 in the target intersection 20.

Based on the real-time road condition information about the target intersection 20 provided with the static obstacle 200 on the right side as shown in FIG. 2, it can be seen that the view range of the current observation view of the ego vehicle 202 is a triangular area filled with dots in FIG. 2. Then, a virtual vehicle 204-1 and a virtual vehicle 204-2 are set on the boundary of the field of view of the current observation field of view, wherein the virtual vehicle 204-1 is set on the left side of the lane Lane_1, the virtual vehicle 204-1 travels to the right to enter the target intersection 20, and the virtual vehicle 204-2 is set on the right side of the lane Lane_2, and the virtual vehicle 204-2 travels to the left to enter the target intersection Here, the virtual vehicle 204-1 and the virtual vehicle 204-2 are each configured with the maximum traveling speed allowed in the corresponding lane. The potential moving obstacles of the ego vehicle 202 in the field blind area are simulated by setting the virtual vehicle to avoid collision of the ego vehicle 202 with the potential moving obstacles after entering the target intersection 20.

Further, the vehicle motion prediction model is input with the vehicle state information of the virtual vehicle, the vehicle state information of the ego vehicle itself, and the vehicle state information of the environment vehicle that is currently passing through the target intersection, and the target travel operation to be executed in the next control cycle is predicted for the ego vehicle to ensure the travel safety when the ego vehicle passes through the target intersection.

Through the embodiments provided by the present application, when the ego vehicle is about to pass through the target intersection, a corresponding virtual vehicle is configured for an observation field of view at which the target intersection is blocked, to simulate potential movement obstructions within occlusion areas, combining vehicle state information about the ego vehicle and an environment vehicle which actually pass through an area where a target intersection is located, the target running action at the time when the ego vehicle passes through the target intersection is predicted by the vehicle motion prediction model. The method enables the ego vehicle to comprehensively know road condition information about a target intersection when passing through the target intersection autonomously, so as to avoid collision risks during driving, thereby achieving the effect of improving the safety of vehicle control, and then overcoming the technical problem of relatively low safety of vehicle control in the related art.

As an, optional solution, the acquiring second vehicle state information under the current driving state of the object vehicle in the area where the target intersection lies includes:

S1, determining an arrival moment of the ego vehicle at the target intersection;

S2, acquiring ambient vehicle state information about an environment vehicle entering the predetermined region at the arrival moment, wherein the second vehicle state information comprises the ambient vehicle state information;

S3, determining a view boundary of a current observation view of the ego vehicle matching, the arrival moment;

S4, acquiring virtual vehicle state information of the virtual vehicle disposed at the boundary of the field of view, wherein the second vehicle state information includes the virtual vehicle state information.

Optionally, in this embodiment, before acquiring the virtual vehicle state information of the virtual vehicle configured at the boundary of the field of view, the method further includes:

1. arranging a first virtual vehicle on a first intersection line of a first lane at a target intersection and intersecting with a visual field boundary, wherein the first intersection line is a starting line of the first virtual vehicle entering a current observation visual field, the driving direction of the first virtual vehicle in the first lane is the same as the driving direction of the ego vehicle, and the first virtual vehicle is configured with a first maximum driving speed allowed by the first lane;

2. A second virtual vehicle is disposed on a second intersecting line of a second lane and a visual field boundary in the target intersection, wherein the second intersecting line is a starting line of the second virtual vehicle entering a current observation visual field, the driving direction of the second virtual vehicle in the second lane is opposite to the driving direction of the ego vehicle, and the second virtual vehicle is configured with a second maximum driving speed allowed by the second lane.

Figure 3:
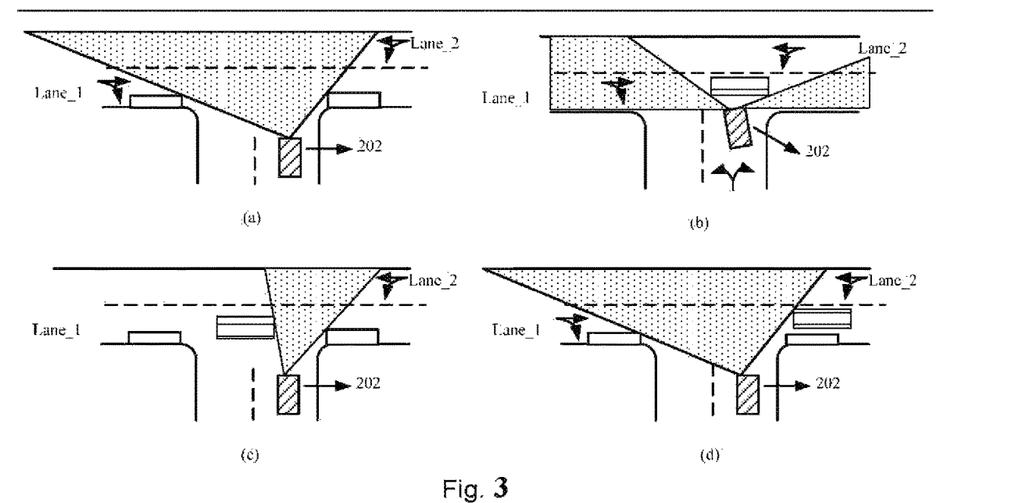
FIG. 3 is a schematic diagram of an optional vehicle control method according to an embodiment of the present invention.

It should be noted that, at an intersection where an automatically-driven vehicle passes through a non-signalized light, it is not only necessary to take account of static obstacles (such as middle-ring islands) and dynamic obstacles (such as a moving vehicle) in a visible area in a visual field; in addition, potential obstacles in the occlusion area outside the observation field of view (such as an occluded mobile vehicle), are also accounted for, allowing the ego vehicle to mimic the human autonomic behavior. As in the face of the intersection shown in FIGS. 3(a)-3(d), dynamic obstacles can be avoided, passing through the target intersection in a small-fender wing by improving the field of vision in one step.

For example, when facing the intersection shown in FIG. 3(a), typically a human driver adopts creep-and-go strategy. He moves forward slowly, watching the oncoming traffic in the lane ahead if he plans to turn right, or in both lanes if he plans a left turn. In this way, he proceeds cautiously to improve visibility until there is enough safe distance for turning.

Dynamic occlusions shown in FIG. 3 (b) as well as more complicated situations shown in FIGS. 3 (c) and 3 (d) are handled in a similar way. Rule-based methods seem to be plausible to imitate human decision given a particular traffic scene, however, it would get overwhelmed easily by the increasing complexity and n certainties and lacks the ability to Generalize.

Figure 4:
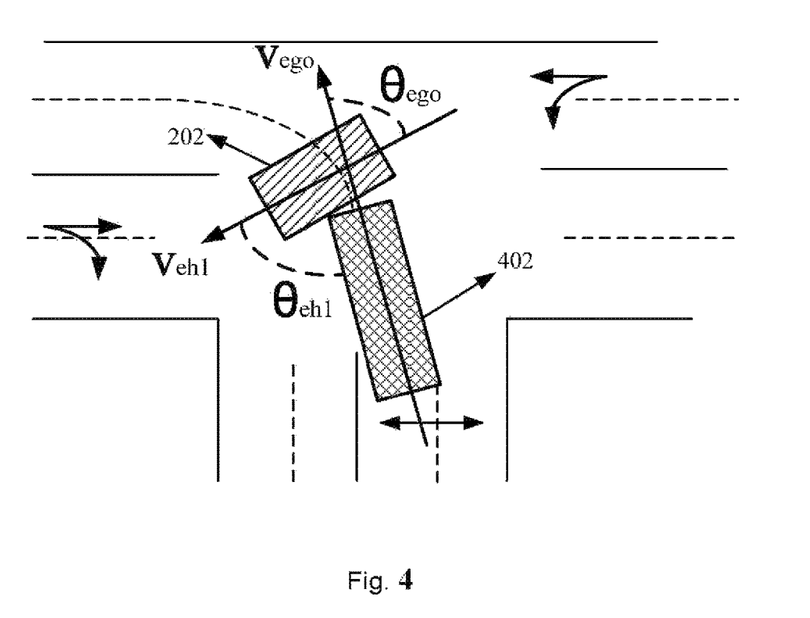
FIG. 4 is a schematic diagram of another alternative vehicle control method according to an embodiment of the present invention.

Accordingly, in order to simulate potential barriers, the virtual vehicle may be provided at the boundary of the field of view of the observation field of view, a traveling direction and a traveling speed are allocated to the vehicle, to simulate it as a real vehicle, thereby predicting whether the ego vehicle will collide with the virtual vehicle when passing through the target intersection, so that the ego vehicle is prevented from colliding with a potential moving obstacle within the occlusion area. The collision scenario about an ego vehicle (that is, the ego vehicle) 202 is as shown in FIG. 4, and the ego vehicle 202 collides with another vehicle 402. Their positions, velocities and angles are known or can be observed.

To achieve a collision-free trajectory, two source of uncertainties need to be considered. The first one is intentions of other vehicles (that is, the environment vehicle). For vehicles with multiple route options, if one of the routes intersect with the route of the ego vehicle, this uncertainty should be incorporated during planning. The other uncertainty comes from occluded area. Possible vehicles (that is, the virtual vehicle) in the occluded area need to be handled if their routes intersect with the ego vehicle's route. The vehicle state information of the ego vehicle includes vehicles' position, speed, angle and the length and width of the ego vehicle.

These information can be estimated from perception results with prior information of different types of vehicles. Given these observations the goal is to generate a sequence of accelerations $a=[a_0; a_1; a_2; \ldots,]$ along the prefixed route, which should enable the ego vehicle to cross the occluded intersection both safely and efficiently.

Figure 5:
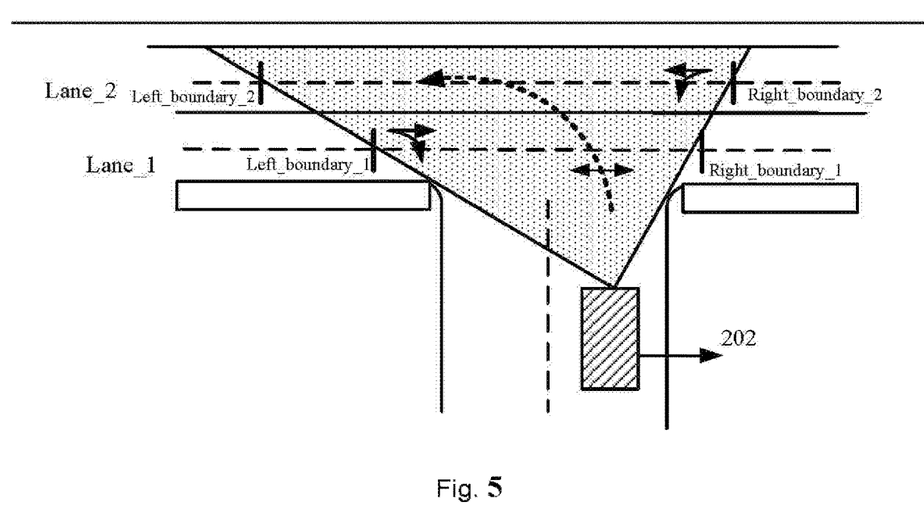
FIG. 5 is a schematic diagram of a further alternative vehicle control method according to an embodiment of the present invention.

The details are described with reference to the following example; It is assumed that real-time road condition information about an ego vehicle is as shown in FIG. 5. The vision of the ego vehicle 202 is blocked. The boundaries of vision in each lane are denoted by vertical bars.

Figure 6:
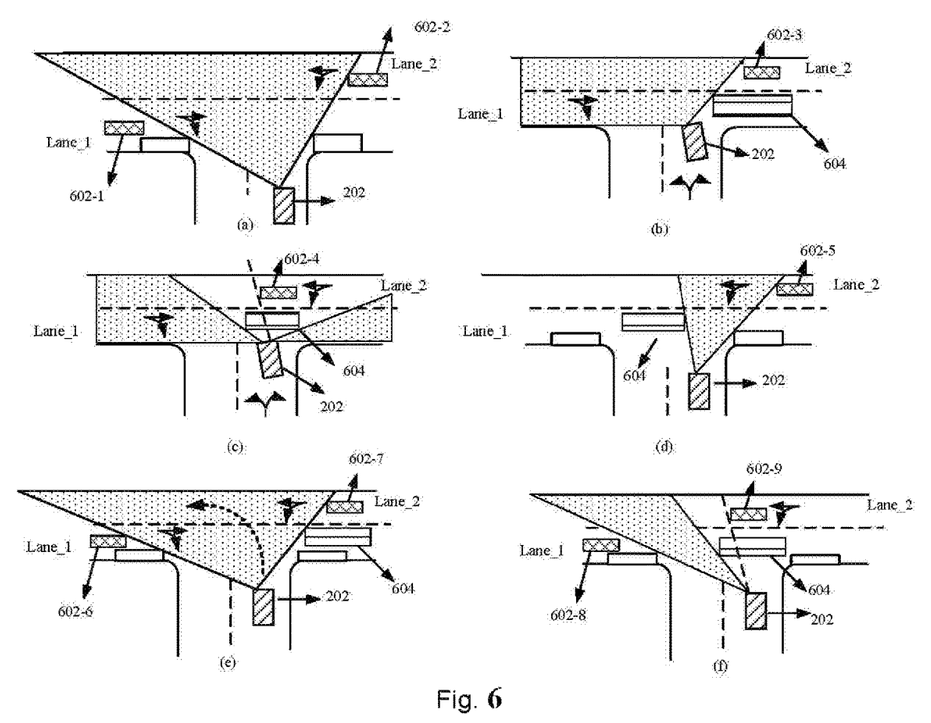
FIG. 6 is a schematic diagram of a further alternative vehicle control method according to an embodiment of the present invention.
Figure 7:
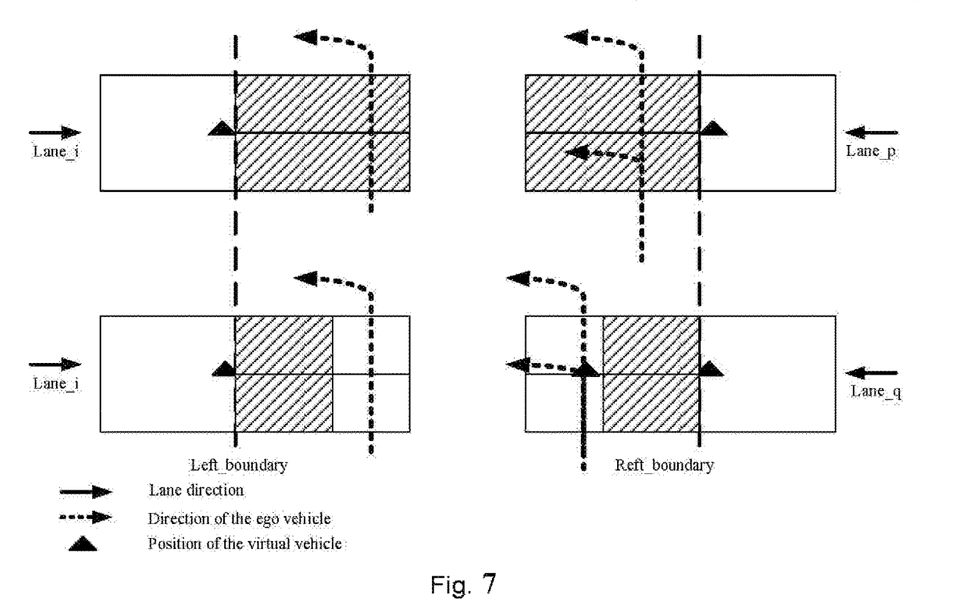
FIG. 7 is a schematic diagram of a further alternative vehicle control method according to an embodiment of the present invention.

In this work, occlusions caused by both static obstacles and dynamic obstacles are considered. Here we propose a general approach to deal with various occlusion scenarios without distinguishing occlusion types. A simple scenario shown in FIG. 5 is used to illustrate the approach. The ego vehicle plans to turn left and there are two horizontal lanes intersecting with the route of the ego vehicle. As is shown in FIG. 5, there are left and right vision boundaries on each lane. Vehicles out of the boundaries are not observable. In order to plan a safe trajectory, virtual vehicles are assumed in the blocked area. Here we adopt a worse-case approach. Virtual vehicles are placed on the vision boundaries and treated as real vehicles for planning. For. Lane_1, since the oncoming traffic from left section could intervene with the ego vehicle 202, a virtual vehicle 602-1 is placed at left boundary 1. For the same reason, a different virtual vehicle 602-2 is placed at right boundary 2. This is shown in FIG. 6 (a).

Dynamic obstacles could cause similar vision occlusion. The virtual vehicle 602-3 is placed at the boundary in the same way as for static obstacles. This is shown in FIG. 6 (b). For scenarios where both static and dynamic occlusion exist, boundaries of vision could be figured out in the same way and thus virtual vehicles (that is, the virtual vehicle 602-5~the virtual vehicle 602-7) are placed similarly as is shown in FIG. 6 (d)(e). A special case is when a big truck 604 is right in front of the ego vehicle 202. In this case, the area behind the truck 604 and within the boundaries will be blocked. To deal with this scenario, a virtual vehicle is placed in the lane behind the truck. The position of the virtual vehicle is symmetric to the ego vehicle 202 with respect to the truck 604, as is shown in FIG. 6 (c)(f), that is, the virtual vehicle 602-4, and the virtual vehicle 602-8~the virtual vehicle 602-9.

For lanes, the direction of which is opposite to the direction of the ego vehicle, virtual vehicles are always placed on the left vision boundary. For lanes with the same direction as the ego vehicle, virtual vehicles are placed on the right vision boundary. In addition, if the facing area of the ego vehicle is blocked, a virtual vehicle is placed there as well. This is illustrated by lane q in FIG. 7(a)-7(d).

Each lane has blocked sections (in blank area) and observable sections (in diagonally-filled area). Occlusions are caused by static obstacles and/or dynamic obstacles. According to lane direction and ego vehicle's direction, virtual vehicles are placed on the vision boundary as well as the blocked area which is right faced by the ego vehicle.

By means of the embodiments provided in the present application, a virtual vehicle is provided at a visual field boundary of an observation visual field to simulate a potential moving obstacle outside the observation visual field, so that an ego vehicle can avoid a potential driving risk during an automatic driving process, thereby ensuring the driving safety when the ego vehicle passes through a target intersection.

As an optional solution, inputting the first vehicle state information and the second vehicle state information into a vehicle motion prediction model to obtain a prediction result comprises:

S1, inputting first vehicle state information and second vehicle state information into a partially observable Markov decision-making process model, wherein the vehicle motion prediction model comprises a partially observable Markov decision-making process model;

S2, predicting and obtaining, by means of a partially-observable Markov decision-making process model, a target acceleration of a travel action to be executed by an ego vehicle in a next control period after a current control period, wherein a prediction result comprises the target acceleration.

It should be noted that, in this embodiment, in order to fully consider various occlusion situations without distinguishing occlusion types, accurate prediction may be implemented by using, but is not limited to, a model established based on a part of an observable Markov POMDP framework.

Optionally, in this embodiment, during the running of the autonomous driving, the ego vehicle independently decides the running action in the next control cycle for the current real-time road condition information and the vehicle state information of the associated vehicle in each control cycle. Thus, it is achieved to control the ego vehicle to move step by step so as to smoothly pass through the target intersection, thereby avoiding collision risk.

Optionally, in this embodiment, the controlling the ego vehicle to execute the target running action according to the prediction result comprises: determining a target running speed of the ego vehicle according to the target acceleration; controlling the ego vehicle to travel according to the target travel speed so as to pass through the target intersection.

By means of the embodiments provided in the present application, by means of a model established by using a POMDP framework, different vehicle state information can be fused, and a driving action of the ego vehicle in a next control period is accurately predicted by means of a solution, of a POMDP solver, thereby achieving the security of ensuring that the ego vehicle drives automatically to pass through an intersection.

As an optional solution, the predicting, by using apart of an observable Markov decision process model, a target acceleration of a travel motion to be executed by the ego vehicle in a next control period after a current control period comprises:

S1, in a partial observable Markov decision process model, based on second vehicle state information, calculating a driving probability of each object vehicle choosing to drive in each lane of the target intersection when passing through a target intersection, so as to obtain a driving probability set for all lanes of the target intersection, wherein the second vehicle state information comprises: a position where the object vehicle is located, a driving speed of the object vehicle, a driving direction of the object vehicle, and a driving route of the object vehicle;

S2, predicting a target acceleration based on a driving probability set and first vehicle state information, wherein the first vehicle state information comprises: a position where the ego vehicle is located, a travel speed of the ego vehicle, a travel direction of the ego vehicle, and a predicted travel route of the ego vehicle.

All virtual vehicles introduced are treated the same as real vehicles for POMDP planning. This includes the possible routes for virtual vehicles that have different route options. The speed of each virtual vehicle is set to the maximum speed allowed in the current lane for prediction. Unlike real vehicles, the placement of virtual vehicles will be reset at each time step, according to the current visibility. Since virtual vehicles are not really moving as in prediction, "optimal" actions generated by classical POMDP solver might not be good decisions and sometimes even cause the system in trouble.

In order to plan a safe trajectory, temporal evolution of traffic situation is required. Typically, a reward is assigned to environment state at each time step. Then a policy is derived through solving an optimization problem such that the expected reward over a time period is maximized. Since intentions of other road users are unknown, probabilistic distribution over intentions need to be maintained and updated each time after new observations are obtained. All of these can be conducted within POMDP framework.

POMDP is a mathematical framework for sequential decision making under uncertainty. It is characterized by a tuple (S,A,O,T,Z,R). Here S,A,O represent state space, action space and observation space respectively. Since traditionally POMDP is applied to applications with discrete space, such as games, S,A,O are all finite sets of values. T represents state transition function and has a probabilistic representation $T(s,a,s')=p(s'|a,s)$ which follows Markov assumption that the state s' only depends on the most recent state s and has nothing to do with previous states. Z denotes observation model $Z(o,s',a)=p(o|s'.a)$. R represents reward function $R(s,a)=R$ which generate a reward value for executing action a in state s. Rewards in the future are discounted exponentially by a factor $\gamma$. Thus the accumulated reward starting from t=0 is expressed as follows:

$$R_0 = \sum_{t=0}^{\infty} \gamma^t R(s_t, a_t) \qquad (1)$$

Since some state information, such as routes of surrounding vehicles, cannot be measured directly, a probabilistic distribution is placed on the state, called belief state. The belief state b(s) represents the probability of being in state s, $b:S \to [0,1]$. The belief b(s) is updated through Bayes' rule, when action a is performed and new observation o is obtained.

$$b'(s') \propto Z(o|s',a) \sum_{a} T(s'|a,s)b(s) \qquad (2)$$

POMDP aims at finding an optimal policy $\pi^*$ which maps belief states to actions such that the expectation of accumulated rewards is maximized. This is shown in Eq. 3.

$$\pi^* = \underset{\pi}{\mathrm{argmax}}\left( E\left[ \sum_{i=0}^{\infty} R(s_t, \pi(b_t)) | b_0, \pi \right] \right) \qquad (3)$$

The details of POMDP modeling are shown below:

1) States and Observations: The state of POMDP includes the information of the ego vehicle as well as all the surrounding vehicles except vehicles in the occluded area. In order to deal with occlusions, virtual vehicles are introduced as stated in the above Section. The information of virtual vehicles is also included in the state. The state of the ego vehicle is defined as $$s_{ego}[l_{ego}, v_{ego}, \theta_{ego}, r_{ego}] \qquad (4)$$

Where $l_{ego}=(x_{ego}; y_{ego})$ is the current position. $\theta$ is the orientation. $r_{ego}$ represents the route which is predefined in this work. $v_{ego}$ denotes the longitudinal speed. The state of surrounding vehicle $veh_i$ is defined in the same way. However, for vehicles that have different route options, $r_{veh_i}$ is not known. For example, the vehicle on the left section of Lane_1 in FIG. 5 can either go straight or turn right, which cannot be measured directly. The state of the ego vehicle is completely known. States of other vehicles except route of those with multiple route options can be observed. For simplicity, no observation noise is introduced, which can be added easily according to sensor fusion precision in real setting.

2) Action Space: The action of the ego vehicle is generated by POMDP solver. In this paper, the action is the longitudinal acceleration. The action space is A={+3 m/s², 0 m/s², −3 m/s²}, the value of which represents acceleration, maintaining current speed and deceleration respectively.

3) Transition Function: Transition function is used to predict future state of the environment given actions conducted at the current time step. In this way, temporal evolution of the traffic situation are achieved during planning. Here we assume that intention and speed of surrounding vehicles maintain unchanged, and the speed of the ego vehicle will be adjusted according to the action at each time step. The transition model is shown in Eq. 5. For all surrounding vehicles, a is set to 0.

$$\begin{bmatrix} l' \\ v' \end{bmatrix} = \begin{bmatrix} 1 & \Delta t \\ 0 & 1 \end{bmatrix} \begin{bmatrix} l \\ v \end{bmatrix} + \begin{bmatrix} 0.5\Delta t^2 \\ \Delta t \end{bmatrix} a \qquad (5)$$

Figure 8:
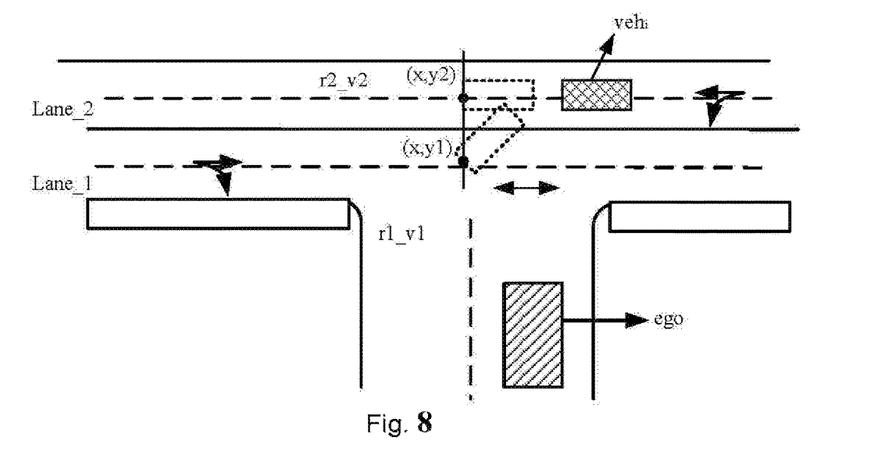
FIG. 8 is a schematic diagram of a further alternative vehicle control method according to an embodiment of the present invention.

4) Belief-Update: Since some vehicles have multiple route options, the probability on each route is adjusted with new observations. This is done following Bayes' rule. For example, in FIG. 8, $veh_i$ has two route options, $r_1$ and $r_2$, and each route has its own reference speed, denoted by $v_1$ and $v_2$ respectively. Given current position p and speed V, the probability of route i; i=1; 2 is updated though Eq. 6.

$$p(r_i | l, v) = \frac{p(l, v | r_i)p(r_i)}{\sum_k p(l, v | r_k)p(r_k)} \qquad (6)$$

We assume that l and v are conditionally independent given $r_i$, thus we have $$p(l,v|r_i)=p(l|r_i)p(v|r_i)=N(y;y_i,\sigma_{y,i})N(v;v_i,\sigma_{v,i}) \qquad (7)$$

Here Gaussian models are used. $y_i$ represents the referred y position given x on route $r_i$. The parameter $\sigma_{y,i}$ and $\sigma_{v,i}$ can be learned from data. In this work, $\sigma_{y,i}=10$ and $\sigma_{v,i}=10$ are used as small variance will cause one possibility drop to zero quickly due to continuous multiplication. More complicated predictors can be created with position P and speed v as two attributes, and trained on sequential history information. However, it is not the focus of this paper.

5) Reward Function: In, this work, the reward function R(s,a)) includes three parts as is shown below:

$$R(s,a)=R_{end}(s)+R_{collision}(s)+R_v(s) \qquad (8)$$

If the ego vehicle finish crossing intersection, a positive reward $R_{end}(s)$ will be assigned. If the ego vehicle collide with other road users, a negative reward $R_{collision}(s)$ will be assigned. $R_{collision}(s)$ is usually set with a high value such that a safe drive is guaranteed. In addition, the ego vehicle is expected to move at a high speed, thus if its speed is below the speed limit of the current lane, a negative reward will be assigned. In this work. we set $R_{end}(s)=1000$ and $R_{collision}(s)=-10000$. The magnitude of $R_v$ should be much smaller than the other rewards, and adjusted according to the current speed.

6) Problems with virtual vehicles: Typically, best actions can be obtained by maximizing Eq. 3. However, it doesn't work well in our problem. This is due to the introduction of virtual vehicles. Virtual vehicles are treated in the same way as real Vehicles during POMDP planning. But they never actually move forward. In fact, the placement of virtual vehicles is reset at each time step given latest visibility of the ego vehicle, which could lead to a freezing state. For example, the ego vehicle might stand still waiting the virtual vehicles to go first according to Eq. 3. However, the virtual vehicles are always assumed at the same vision boundary, which makes the ego vehicle to stand still forever. To avoid the freezing state, the ego vehicle need a push even if standing still has maximum expected reward. To help the ego vehicle get out of the freezing state and at the same time encourage high driving speed, different priorities are assigned to different actions.

Through the embodiments provided by the present application, the running intention of the object vehicle is acquired by acquiring the running probability of the object vehicle when selecting each lane, and determining a driving action of the ego vehicle in conjunction with the driving intention, so that the travel trajectory of the ego vehicle when passing through the target intersection does not intersect with the travel trajectory of the object vehicle, that is, the collision is avoided, as a result, the safety of vehicle control can be improved.

As an optional solution, the predicting the target acceleration based on the driving probability set and the first vehicle state information includes:

S1, According to the driving probability set and the first vehicle state information, searching a pre-built search tree for a target path, and use the acceleration corresponding to the target node in the target path as the target acceleration, wherein. Each node on the search tree is configured with a corresponding node reward value, The node reward value is associated with a predicted collision outcome based on the path of the current node, and each node is connected to the following sub-nodes: an accelerating node for controlling the acceleration of the vehicle, a decelerating node for controlling the deceleration of the vehicle, and a maintaining node for controlling the vehicle to maintain the current speed, the selection priority of the acceleration node is higher than the selection priority of the hold node, the selection priority of the hold node is higher than the selection priority of the deceleration node.

As an optional solution, the searching, according to the driving probability set and the first vehicle state information, for a target path in a pre-established search tree includes:

S1, traversing the search tree until a target path is found:

S11, acquiring a current acceleration corresponding to the current node;

S12, predicting a collision prediction result of the ego vehicle colliding with the object vehicle when the ego vehicle travels at the travel speed corresponding to the current acceleration using the current acceleration, the driving probability set and the first vehicle state information;

S13, in the case where the collision prediction result indicates no collision, taking the current node as a node in the target path, and acquiring a node from a child node connected to the current node as the current node;

S14. If the collision prediction results of all the nodes in the found searching path indicate that no collision exists, determine the searching path as the target path.

In this work, in order to deal with dynamic environment, POMDP is solved in an online manner. This is necessary since visibility changes as the ego vehicle moves forward. The online solver plans a sequence of actions up to a certain horizon. But the ego vehicle will only conduct the first action and this will be recomputed when comes to the next time point.

POMDP is typically solved by traversing a belief search tree, where best actions are selected along a path which has maximum expected reward. However, the computational complexity of constructing the full tree can be too high to be practical. Thus various approximate POMDP solvers have been developed. Most of them are designed for discrete state space and don't take into account the characteristics of a particular application. Here we develop a customized POMDP solver which could naturally address problems caused by virtual vehicles and at the same time reduce the computational complexity. The solver is detailed as follows.

Figure 9:
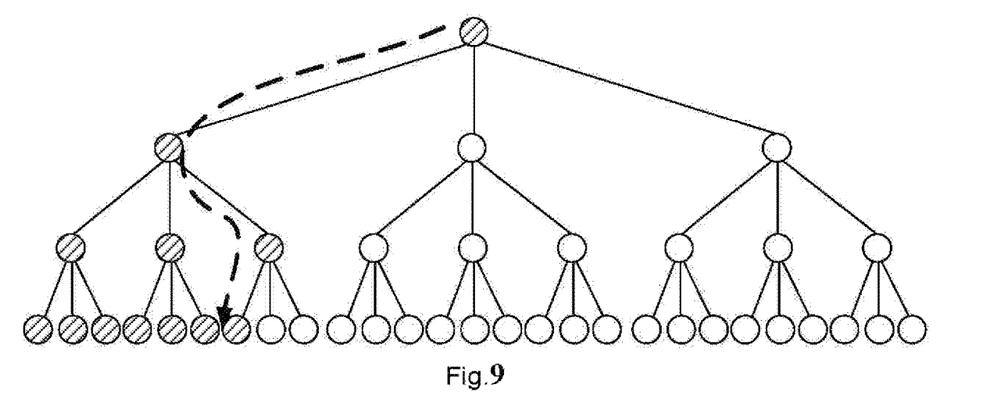
FIG. 9 is a schematic diagram of a further alternative vehicle control method according to an embodiment of the present invention.

1) Belief Update. Usually, the belief search tree considers possible observations and thus belief update is performed during tree construction. This is not necessary for applications with continuous state space as observation space is no longer a finite set of values. These virtual observations are generated from probabilistic observation model and might have large difference from the true observations. Also, planning is conducted in an online manner, which could adapt to environment changes. Thus, in this work, belief of each node remains unchanged. This is shown in FIG. 9. Each node represents a belief state. Three edges branching out from the node represent acceleration ("+"), maintaining current speed ("0") and deceleration ("−") respectively. The curve in red denotes a successful path from root to leaf. All nodes in blue have been visited and nodes in grey will not be visited.

3) Action Priority. It is anticipated that the ego vehicle moves at a high speed with less slowdown. This is typically achieved by assigning a negative reward when the speed of the ego vehicle is below a certain threshold, such as the speed limit of the current lane. This has been successfully applied to intersection crossing scenarios. Here, different actions are assigned to different priorities. Acceleration has the highest priority, following by maintaining current speed, and deceleration has lowest priority. In this way, high speed is encouraged and the ego vehicle can also be pushed out of dead situation. To guarantee actions with higher priority are always visited first, a searching strategy is developed.

4) Searching Strategy To work with action priorities, a depth-first search is performed as is shown in FIG. 9. Here the schemes in the application are trying to find a path which starts from the root and ends at the leaf without any collision. If such path is discovered, then the tree traversing stops. In this way, acceleration is always visited first and deceleration is visited only if acceleration and maintaining constant speed don't work. For example, if the dotted curve in FIG. 9 is a complete path without collision, then the best action for the current time point will be acceleration. The slash-filled nodes have been visited and the blank nodes will never be visited as a successful path has already been found. This strategy could also improve the average computational cost. Suppose each leaf has the same probability p to be the end of a successful path, then the expectation of how many leaf nodes need to be visited forms a geometric series, which is shown in Eq. 9.

$$E[N] = p + 2(1-p)p + 3(1-p)^2 + \ldots \approx \frac{1}{p} \quad (9)$$

Compared with the number of leaves $|a|^H$ where $|a|$ indicates the size of the action space and H indicates the planning horizon, $$\frac{1}{p}$$

is usually much smaller and the worst case is $|a|^H$.

Besides the above searching strategy, other tricks can also help reduce computational complexity. Since the trajectories of other vehicles are fixed during prediction, the state of each vehicle at each future time step can be calculated in advance and this will eliminate repeated calculation at each node. Another reason for high computational cost is the belief state which includes different combination of states. Suppose each vehicle has 2 route options and there are 5 vehicles in the scene, then the total number of combinations will be 25. For each combination, collision will be checked and reward is assigned at each node. If speed variety is also considered, the total number of combinations can be too large to compute in real time. This can be relived by decomposing the utility function, which plans with each individual vehicle and merge the result to select the best action.

As an optional solution, the searching for the target path in the pre-established search tree according to the driving probability set and the first vehicle state information includes:

S1, traversing a search tree, and sequentially taking each node in the search tree as a current node to execute the following operations:

S11, acquiring a first cumulative value and a reference cumulative value set obtained by performing weighted summation from a node reward value of a starting node of a search tree to a node reward value of a current node, wherein, the reference cumulative value set includes a plurality of second cumulative values, the second accumulated value is an accumulated value obtained by performing weighted summation on a node reward value of the start node and a node reward value of any other node located in the same level as the current node;

S12, in the case where the first accumulated value is greater than each second accumulated value in the reference accumulated value set, the current node is taken as a node in the target path, and one node is acquired from the child nodes connected to the current node as the current node;

S13. If the current node is located in the leaf-node layer, take the path from the start node to the current node as the target path.

Optionally, In this embodiment, when the target path is found in the pre-established search tree, further comprising: configuring a corresponding node reward value for each node on the search tree, wherein, the node reward value is a result of a weighted sum of a first reward value at which the ego vehicle collides with the search path based on the current node when crossing the target intersection, a second reward value at which the ego vehicle does not collide with the search path based on the current node when crossing the target intersection, and a reference reward value.

Figure 10:
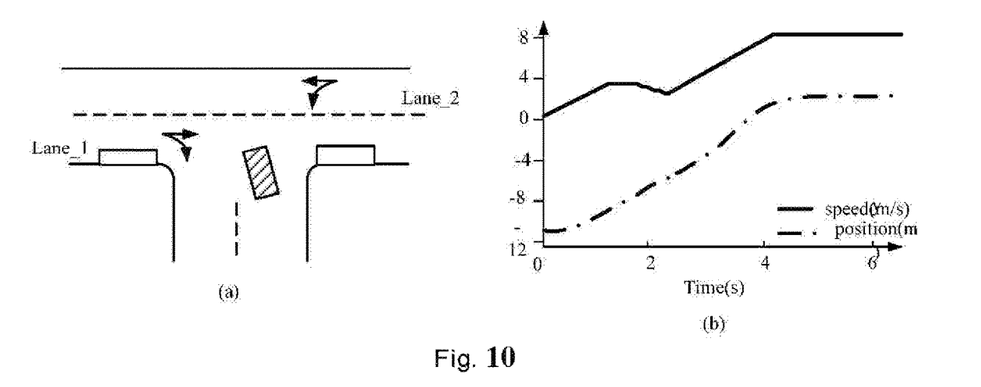
FIG. 10 is a schematic diagram of a further alternative vehicle control method according to an embodiment of the present invention.

The solutions in the embodiments of the present application are fully described with reference to the examples shown in FIG. 10 to FIG. 12.

In this work, experiments are conducted in SUMO simulator. SUMO is an open source package for traffic simulation. It can model road networks as well as other traffic elements. It also provides API, TraCI, for on-line interaction. The behavior of each vehicle can be controlled at each simulation step. However, acceleration which is the output of POMDP cannot be controlled directly, only maximum acceleration can be set. Thus we adjust speed at each simulation time step according to Eq. 5 given current action, the time interval for planning and simulation is 0.1 s. Although SUMO provides Intelligent Driver Model (IDM) to control each vehicle's behavior, it is not used in this work. The reasons lie in two folds. First, vehicles with IDM will slow down to avoid collision and sometimes freeze the traffic if collision is predicted. Second, the intelligent behaviors of surrounding vehicles make it difficult to evaluate the proposed approach. Thus all other vehicles move in a prefixed pattern without collision avoidance.

We first analyze the behavior of the ego vehicle when only static occlusions exist. As is shown in FIG. 10(*a*), The ego vehicle plans a left turn, thus two virtual vehicles are assumed as in FIG. 6. In this case, no real surrounding vehicles exist. FIG. 10(*b*) shows the speed curve as well as y position of the ego vehicle. As we can see, the ego vehicle first accelerate as the assumed virtual vehicles are far from it. Then the ego vehicle stops accelerating as continuous acceleration might cause collision but at the same time there is no need to decelerate. As the ego vehicle continues approaching horizontal lanes ahead, it starts decelerating. After it makes sure it is safe to turn left, it starts acceleration until reach the maximum speed allowed.

To get full observation of the traffic, the ego vehicle need to reach the position where y)=−4 m. As we can see in FIG. 10(b) the ego vehicle starts accelerating at t=2:3 s before full vision is obtained. The reason is that, at t=2:3 s, there is enough distance between the ego vehicle and the virtual vehicles and thus left turn will not lead to any collision. This is exactly how human drivers react. In many cases, we cannot get full observation of the traffic, but as long as we make sure that there is enough distance, we start crossing the intersection.

Figure 11:
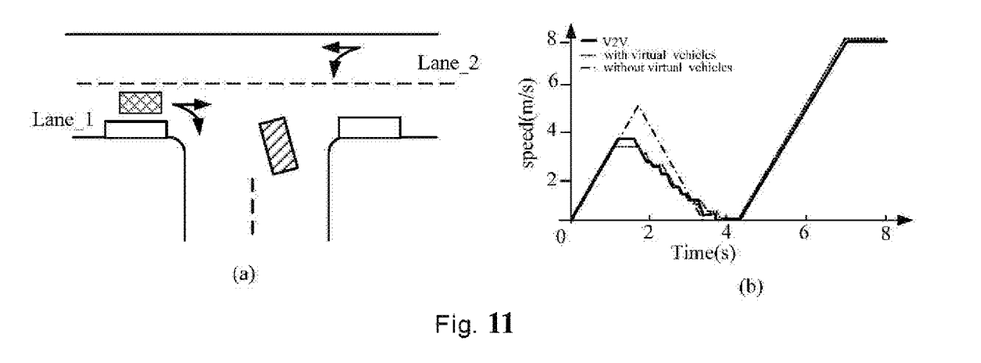
FIG. 11 is a schematic diagram of a further alternative vehicle control method according to an embodiment of the present invention.
Figure 12:
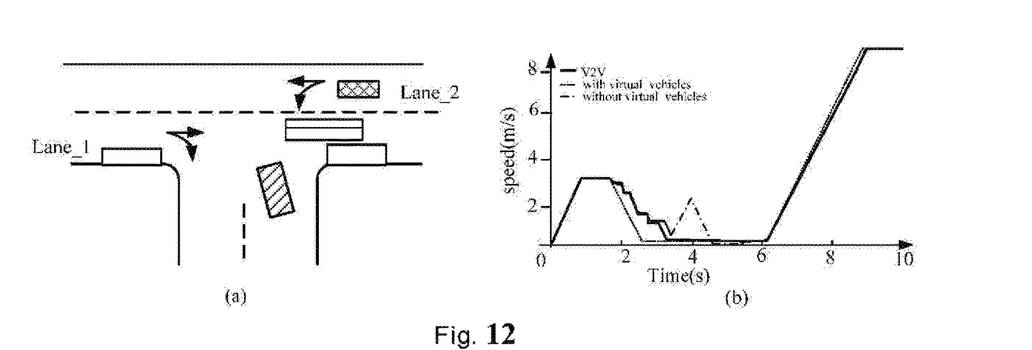
FIG. 12 is a schematic diagram of a further alternative vehicle control method according to an embodiment of the present invention.

In FIG. 11, we compare the proposed approach with two other strategies. One is V2V communication, which allows the ego vehicle access information in the occluded area. The other one doesn't address occlusions and thus no virtual vehicles are assumed. As we can see, the proposed approach has a similar curve as V2V communication. If no measures are taken to deal with occlusions, the ego vehicle will accelerate until it observes the other vehicle. In this case, the two vehicles collide at t=−3:7 s.

Here we consider the scenario where a moving truck blocks the vision of the ego vehicle. To eliminate other factors, static occlusions are removed. As is shown in FIG. 12, the ego vehicle is turning left at the intersection, while a truck is approaching and block the vision of the ego vehicle, at the same time, another vehicle is behind the truck and cannot be observed by the ego vehicle. Since the truck blocks the vision, virtual vehicles are placed sequentially according to FIGS. 6(b) and 6(c).

The proposed approach is compared with two other strategies, V2V communication and the baseline with no virtual vehicles assumed. FIG. 12 shows the speed curves of the three strategies. As we can see, both V2V and the proposed approach could finish left turn without any collision, while the baseline method causes collision at t=5:7 s. We also notice that the speed curves between V2V and the proposed approach are quite close except that the proposed approach leads to a little more conservative behavior. Strategy of crossing occluded intersections for autonomous vehicles is discussed in this paper. Both static and dynamic occlusions are addressed. A general approach is proposed to deal with various occlusion scenarios. The problem is solved within POMDP framework. Since virtual vehicles are introduced and they behave differently from real vehicles, actions provided by classical POMDP solver are no longer optimal and sometimes freeze the whole system. To coordinate with the proposed approach, a customized POMDP solver is developed. In addition, it also reduces average computational complexity.

The performance of the approach is evaluated in both static and dynamic occlusion scenarios. Experimental results show that the ego vehicle exhibits a human-like driving behavior. We also compare it with other strategies. It is shown that the proposed approach is effective in collision avoidance. In addition, our approach can be easily extended to intersections with different lane layouts.

It should be noted that, for brevity of description, the foregoing method embodiments are described as a series of action combinations. However, persons skilled in the art should understand that the present invention is not limited by the described action sequence, because according to the present invention, some steps may be performed in another sequence or simultaneously. Secondly. those skilled in the art should also know that the embodiments described in the description are all preferred embodiments, and the involved actions and modules are not necessarily required in the present invention.

Figure 13:
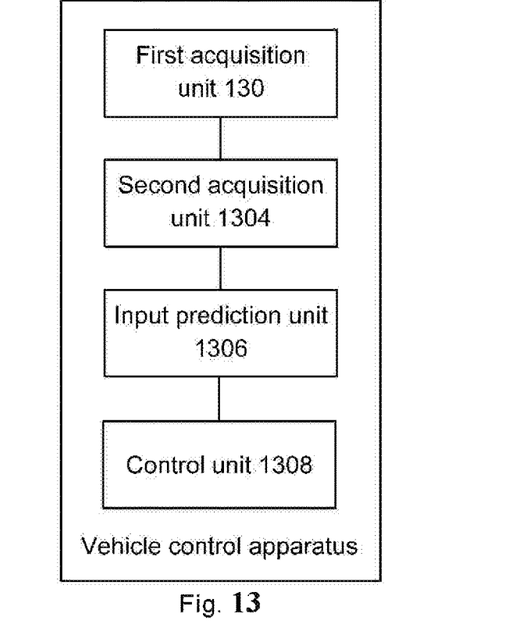
FIG. 13 is a schematic structural diagram of an optional vehicle control apparatus according to an embodiment of the present invention.

According to another aspect of the embodiments of the present invention, there is also provided a vehicle control apparatus for implementing the vehicle control method described above. As shown in FIG. 13, the apparatus includes:

1) a first acquisition unit 1302 for acquiring real-time road condition information about the ego vehicle;
2) a second acquisition unit 1304, when the real-time road condition information indicates that the ego vehicle arrives at the target intersection, acquiring first vehicle state information about the ego vehicle in a current travelling state and second vehicle state information about an object vehicle in a predetermined region encompassing the target intersection and a predetermined area of inbound and outbound lanes of the target intersection adjacent the target intersection in the current travelling state, wherein, the object vehicle includes: an environment vehicle passing through the target intersection and a virtual vehicle configured for a current observation field of view of the ego vehicle;
3) an input prediction unit 1306 for inputting first vehicle state information and second vehicle state information into a vehicle motion prediction model to obtain a prediction result, wherein the vehicle motion prediction model is used for predicting a driving motion of a vehicle in a next control cycle based on vehicle state information about the vehicle in a current control cycle;
4) A control unit 1308 for controlling the ego vehicle to perform a target running action in accordance with the prediction result.

For a specific embodiment, reference may be made to the foregoing embodiment of the vehicle control method, and details are not repeatedly described herein in this embodiment.

According to another aspect of the embodiments of the present invention, a computer readable storage medium is further provided, wherein the computer readable storage medium stores a computer program, and the computer program is configured to execute the steps in any one of the method embodiments when running.

Alternatively, in this embodiment, the computer readable storage medium may be arranged to store a computer program for executing the following steps:

S1, acquiring real-time road condition information about an ego vehicle;
S2, When the real-time road condition information indicates that the ego vehicle arrives at the target intersection, acquiring vehicle state information, the vehicle state information comprising first vehicle state information about the ego vehicle in a current travelling state and second vehicle state information about an object vehicle in a predetermined region encompassing. the target intersection and a predetermined area of inbound and outbound lanes of the target intersection adjacent the target intersection in the current travelling state, wherein, the object vehicle includes: an environment vehicle passing through the target intersection and a virtual vehicle configured for a current observation field of view of the ego vehicle;
S3, inputting the first vehicle state information and the second vehicle state information into a vehicle motion prediction model to obtain a prediction result, wherein the vehicle motion prediction model is used for predicting a driving motion of the vehicle in the next control cycle based on the vehicle state information about the vehicle in the current control cycle;

S4, controlling the target vehicle to perform the target running action according to the predicted result.

Optionally, in this embodiment, a person of ordinary skill in the art may understand that all or a part of the steps of the methods in the foregoing embodiments may be implemented by a program instructing relevant hardware of a terminal device. The program may be stored in a computer readable storage medium, and the storage medium may include a flash memory disk, Read-Only Memory (ROM), Random Access Memory (RAM), a magnetic disk, or an optical disk.

The sequence numbers of the embodiments of the present invention are only for description, and do not represent the preference of the embodiments.

If the integrated unit in the foregoing embodiment is implemented in a form of a software functional unit and sold or used as an independent product, the integrated unit may be stored in the foregoing computer-readable storage medium. Based on such understanding, the technical solutions of the present invention essentially, or the part contributing to the prior art, or all or a part of the technical solutions may be implemented in a form of a software product, the computer software product is stored in a storage medium, the software product includes several instructions for instructing one or more computer devices (which may be a personal computer, a server, a network device, or the like) to perform all or a part of the steps of the methods described in the embodiments of the present invention.

In the foregoing embodiments of the present invention, descriptions of the embodiments are focused on each other, and for a part that is not described in detail in a certain embodiment, reference may be made to related descriptions of other embodiments.

In the several embodiments provided in the present application, it should be understood that the disclosed client may be implemented in other manners. The apparatus embodiments described above are merely exemplary. For example, division of the units is merely logical function division, and may be other division in actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between units or modules may be implemented in electronic or other forms.

The units described as separate parts may or may not be physically separate, and parts displayed as units may or may not be physical units, may be located in one position, or may be distributed on a plurality of network elements. A part or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, and may also be implemented in a form of a software functional unit.

The above are only preferred embodiments of the present invention. It should be noted that, a person of ordinary skill in the art may make further improvements and modifications without departing from the principle of the present invention, and these improvements and modifications shall also belong to the scope of protection of the present invention.

What is claimed is:

1. A vehicle control method, comprising:
acquiring real-time road condition information about an ego vehicle;
acquiring vehicle state information in response to the real-time road condition information indicates that the ego vehicle arrives at a target intersection, wherein the vehicle state information comprises first vehicle state information of the ego vehicle and second vehicle state information of an object vehicle in a predetermined region encompassing the target intersection and a predetermined area of inbound and outbound lanes of the target intersection adjacent the target intersection, the object vehicle comprising an environment vehicle actually passing through the target intersection and two virtual vehicles, the two virtual vehicles being provided at boundaries of a current observation field of view of the ego vehicle, and being configured for simulating potential movement obstructions within blocked areas;
obtaining a prediction result by inputting the vehicle state information into a vehicle motion prediction model; and
controlling the ego vehicle according to the prediction result when the ego vehicle passes through the target intersection.

2. The method according to claim 1, wherein the prediction result comprises a target acceleration of the ego vehicle; and wherein the obtaining of the prediction result comprises:
predicting the target acceleration of the ego vehicle by inputting the vehicle state information into a partially observable Markov decision-making process model of the vehicle motion prediction model.

3. The method according to claim 2, wherein the controlling of the ego vehicle according to the prediction result when the ego vehicle passes through the target intersection comprises:
determining a target driving speed of the ego vehicle according to the target acceleration; and
controlling the ego vehicle to travel according to the target driving speed when the ego vehicle passes through the target intersection.

4. The method according to claim 2, wherein the predicting of the target acceleration of the ego vehicle comprises:
calculating a driving probability of the object vehicle choosing to drive in each of lanes each lane of the target intersection when the object vehicle passes through the target intersection based on the second vehicle state information, and obtaining a driving probability set for all lanes of the target intersection; and
predicting the target acceleration based on the driving probability set and the first vehicle state information.

5. The method according to claim 1, wherein the current observation field of view of the ego vehicle is a triangular area; and
wherein one virtual vehicle of the two virtual vehicles is set on one boundary of the current observation field of view, and is set on a left side of one lane of the target intersection, and travels to a right to enter the target intersection, and another vehicle of the two virtual vehicles is set on a right side of another lane of the target intersection, and travels to a left to enter the target intersection.

6. The method according to claim 1, wherein the second vehicle state information comprises ambient vehicle state information of the environment vehicle and virtual vehicle state information of each of the two virtual vehicles.

7. The method according to claim 1, wherein the first vehicle state information comprises: a position where the ego vehicle is located, a driving speed of the ego vehicle, a travel direction of the ego vehicle, and a predicted travel route of the ego vehicle.

8. The method according to claim 1, wherein the second vehicle state information comprises: a position where the object vehicle is located, a driving speed of the object vehicle, a driving direction of the object vehicle, and a driving route of the object vehicle.

9. A vehicle control apparatus, comprising:
a computer program configured to perform a vehicle control method when executed; and a computer readable storage medium configured to store the computer program; wherein the vehicle control method comprises:
acquiring real-time road condition information about an ego vehicle;
acquiring vehicle state information in response to the real-time road condition information indicates that the ego vehicle arrives at a target intersection, wherein the vehicle state information comprises first vehicle state information of the ego vehicle and second vehicle state information of an object vehicle in a predetermined region encompassing the target intersection and a predetermined area of inbound and outbound lanes of the target intersection adjacent the target intersection, the object vehicle comprising an environment vehicle actually passing through the target intersection and two virtual vehicles, the two virtual vehicles being provided at boundaries of a current observation field of view of the ego vehicle, and being configured for simulating potential movement obstructions within blocked areas;
obtaining a prediction result by inputting the vehicle state information into a vehicle motion prediction model; and
controlling the ego vehicle according to the prediction result when the ego vehicle passes through the target intersection.

10. A non-transitory computer readable storage medium, comprising: a processor; and a stored program configured to perform a vehicle control method when executed by the processor, wherein the vehicle control method comprises:
acquiring real-time road condition information about an ego vehicle;
acquiring vehicle state information in response to the real-time road condition information indicates that the ego vehicle arrives at a target intersection, wherein the vehicle state information comprises first vehicle state information of the ego vehicle and second vehicle state information of an object vehicle in a predetermined region encompassing the target intersection and a predetermined area of inbound and outbound lanes of the target intersection adjacent the target intersection, the object vehicle comprising an environment vehicle actually passing through the target intersection and two virtual vehicles, the two virtual vehicles being provided at boundaries of a current observation field of view of the ego vehicle, and being configured for simulating potential movement obstructions within blocked areas;
obtaining a prediction result by inputting the vehicle state information into a vehicle motion prediction model; and
controlling the ego vehicle according to the prediction result when the ego vehicle passes through the target intersection.

11. The non-transitory computer readable storage medium according to claim 10, wherein the prediction result comprises a target acceleration of the ego vehicle; and wherein the obtaining of the prediction result comprises:
predicting the target acceleration of the ego vehicle by inputting the vehicle state information into a partially observable Markov decision-making process model of the vehicle motion prediction model.

12. The non-transitory computer readable storage medium according to claim 11, wherein the controlling of the ego vehicle according to the prediction result when the ego vehicle passes through the target intersection comprises:
determining a target driving speed of the ego vehicle according to the target acceleration; and
controlling the ego vehicle to travel according to the target driving speed when the ego vehicle passes through the target intersection.

13. The non-transitory computer readable storage medium according to claim 11, wherein the predicting of the target acceleration of the ego vehicle comprises:
calculating a driving probability of the object vehicle choosing to drive in each lane of the target intersection when the object vehicle passes through the target intersection based on the second vehicle state information, and obtaining a driving probability set for all lanes of the target intersection; and
predicting the target acceleration based on the driving probability set and the first vehicle state information.

14. The non-transitory computer readable storage medium according to claim 10, wherein the current observation field of view of the ego vehicle is a triangular area; and
wherein one virtual vehicle of the two virtual vehicles is set on one boundary of the current observation field of view, and is set on a left side of one lane of the target intersection, and travels to a right to enter the target intersection, and another vehicle of the two virtual vehicles is set on a right side of another lane of the target intersection, and travels to a left to enter the target intersection.

15. The non-transitory computer readable storage medium according to claim 10, wherein the second vehicle state information comprises ambient vehicle state information of the environment vehicle and virtual vehicle state information of each of the two virtual vehicles.

16. The non-transitory computer readable storage medium according to claim 10, wherein the first vehicle state information comprises: a position where the ego vehicle is located, a driving speed of the ego vehicle, a travel direction of the ego vehicle, and a predicted travel route of the ego vehicle; and wherein the second vehicle state information comprises: a position where the object vehicle is located, a driving speed of the object vehicle, a driving direction of the object vehicle, and a driving route of the object vehicle.

* * * * *